United States Patent
Tadokoro et al.

[15] 3,657,893
[45] Apr. 25, 1972

[54] EXHAUST GAS PURIFICATION SYSTEM FOR INTERNAL COMBUSTION ENGINE

[72] Inventors: Tomoo Tadokoro, Kure; Motoyuki Hayashida, Kamo; Shigetake Yoshimura, Hiroshima, all of Japan

[73] Assignee: Toyo Kogyo Company Limited, Hiroshima-ken, Japan

[22] Filed: Feb. 27, 1970

[21] Appl. No.: 14,970

[30] Foreign Application Priority Data

Mar. 4, 1969 Japan..................................44/19336

[52] U.S. Cl..............................................60/289, 137/569
[51] Int. Cl..............................................F01n 3/10
[58] Field of Search................................60/30; 137/563, 569; 123/119 B

[56] References Cited

UNITED STATES PATENTS

| | | | |
|---|---|---|---|
| 3,237,399 | 3/1966 | Hamblin | 60/30 |
| 2,592,380 | 4/1952 | Beckett | 123/119 B |
| 3,359,960 | 12/1967 | Pittsley | 123/119 B |
| 3,430,437 | 3/1969 | Saussele | 60/30 |

*Primary Examiner*—Douglas Hart
*Attorney*—Wenderoth, Lind & Ponack

[57] ABSTRACT

An exhaust gas purification system for an internal combustion engine comprises a control valve means which automatically controls the supply of the secondary air to an exhaust passage or a reactor connected to said passage of an engine according to the running conditions of the engine such as revolution speed, acceleration or deceleration, magnitude of load, etc.

10 Claims, 3 Drawing Figures

INVENTORS
TOMOO TADOKORO
MOTOYUKI HAYASHIDA
SHIGETAKE YOSHIMURA

BY *Wenderoth, Lind & Ponack*
ATTORNEYS

EXHAUST GAS PURIFICATION SYSTEM FOR INTERNAL COMBUSTION ENGINE

This invention is related to an improvement on an exhaust gas purification system for an internal combustion engine and particularly to an exhaust gas purification system comprising a control valve means which automatically controls the supply of the secondary air to an exhaust passage or a reactor connected to said passage of the engine according to the running conditions of the engine such as revolution speed, acceleration or deceleration, extent of load, etc.

Generally, as the volume of exhaust gas from an internal combustion engine, and the volume and concentration of the unburnt noxious contents, such as carbon monoxide or hydrocarbon contained in exhaust gas, will vary depending on the running conditions of the engine, for example, revolution speed, acceleration or deceleration, or extent of load, the supply of the secondary air required for oxidation and removal of the unburnt noxious contents also will vary depending on the running conditions of the engine. That is, the required volume of the secondary air is larger when the engine is running at low speed than when it is running at high speed and even when it is running at the same speed, this volume is larger during acceleration or under a larger load than during deceleration or under a smaller load.

However, an air pump which is driven by the engine feeds, independently of the running conditions of the engine, the secondary air which increases with an increase in the engine rpm. Accordingly, if the air pump functions so that the volume of the required large secondary air required at low speed can be fed, a still larger volume of the secondary air will be fed at high speed where only a small supply of the secondary air is required, thus elevating to no purpose the exhaust temperature and greatly impairing the durability of the reactor, etc. On the other hand, if the air pump functions so that the volume of the secondary air which is optimum for high-speed running is fed, the volume of the secondary air for low-speed running becomes insufficient and the unburnt noxious contents can not be completely eliminated. Also, if the air pump functions so that the volume of the secondary air required for acceleration or a large load at a certain speed is fed, excessive secondary air for deceleration or a small load, with the motor at the same speed, will be fed, resulting in reducing the exhaust gas temperature and interfering with removal of the unburnt noxious contents. On the other hand, if the air pump functions so that the volume of the secondary air which is optimum for deceleration or a small load is fed, the supply of the secondary air for acceleration or a large load will insufficient and the unburnt noxious contents can not be completely eliminated.

The object of this invention is to obtain an exhaust gas purification system for an internal combustion engine, which is free of the above defects.

Further, this invention aims at obtaining an exhaust gas purification system for an internal combustion engine, which can automatically control the supply of the secondary air to the exhaust passage or reactor connected to said passage of the engine so that it is the optimum volume according to the running conditions of the engine, such as revolution speed, acceleration or deceleration, extent of load, etc.

The objects and advantages of this invention will be made clear in the following description and attached drawing.

Figure 1:
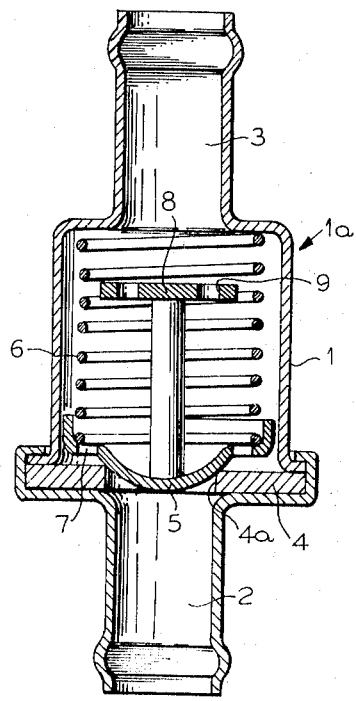
FIG. 1 is a vertical section of an embodiment of the control valve means applied to the exhaust gas purification system for an internal combustion engine according to this invention.

Referring to FIG. 1, 1 is a valve body having on either end an inlet port 2 and an outlet port 3 for the secondary air, and provided inside this valve body 1 is a valve seat 4 having an opening 4a which is connected to an inlet port 2. 5 is a main valve which opens and closes the opening 4a of the valve seat 4 and is forced by a spring 6 to close the opening 4a. 7 is a hole which is provided on the main valve 5 so as to reduce the resistance of the secondary air flowing into the valve body 1 from the opening 4a and 8 is an auxiliary valve which consists of a plate member, provided on the main valve 5 integral therewith and opposed to the outlet port 3. Also, this auxiliary valve is provided with an appropriate number of ventilating holes 9. When the auxiliary valve 8 moves together with the main valve 5 and closes the outlet port 3, the ventilating holes 9 permit a small amount of the secondary air to flow therethrough.

Figure 2:
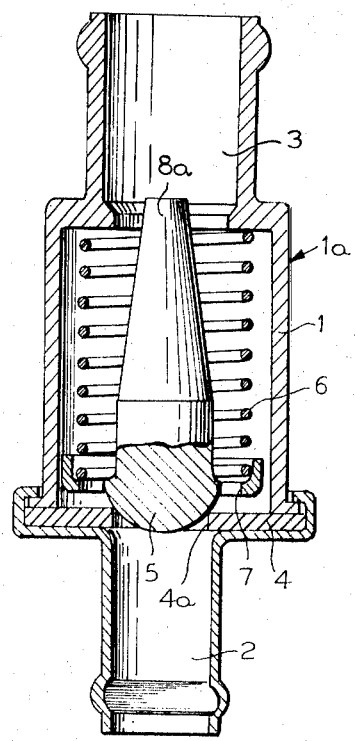
FIG. 2 is a vertical section of a modification of the valve means FIG. 1.

A modification of the control valve means shown in FIG. 2 has the same symbols as in FIG. 1 for the same parts. In this modification, an auxiliary valve 8a which extends from the main valve 5 toward the outlet port 3 as an integral part of the main valve 5 consists of a bar member tapering as it extends away from the main valve. This auxiliary valve 8a moves together with the main valve 5 and functions to gradually reduce the area of the outlet port 3 through which the secondary air flows by protruding into said outlet port 3.

Figure 3:
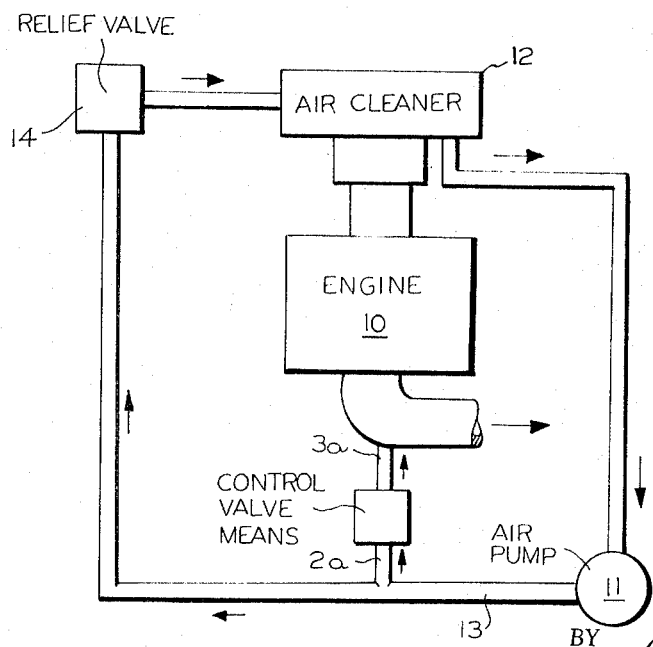
FIG. 3 shows the arrangement of a exhaust gas purification system for an internal combustion engine, to which a control valve means shown in FIGS. 1 and 2 are applied.

The control valve means 1a shown in FIGS. 1 and 2 is arranged to be inside the exhaust gas purification system for an internal combustion engine, as shown in FIG. 3. That is, 10 is an internal combustion engine and 11 is an air pump which is driven by the internal combustion engine 10 and discharges, according to the engine r.p.m., the air purified through an air cleaner 12 into a secondary air pipe 13. This secondary air pipe 13 is connected through a conduit 2a to the inlet port 2 of the control valve means 1a and the outlet port 3 of the control volume means 1a is connected through a conduit 3a to the exhaust passage or a reactor (not shown) connected to said passage of the internal combustion engine 10 so as to feed the secondary air into said passage or reactor. Also, the secondary air pipe 13 is connected to a relief valve means 14 and the opening or closing of this relief valve means 14 controls the air pressure inside the secondary air pipe 13 or the conduit 2a. The secondary air released from the relief valve means is led into the air cleaner 12.

In this invention, when the air pump 11 is driven in accordance with the revolution of the engine 10 and the air pressure inside the secondary air pipe 13 or the conduit 2a reaches to a certain value, the main valve 5 is pushed open against the force of the spring 6, and the secondary air enters into the valve body 1 through the opening 4a of the valve seat 4 and is fed into the exhaust passage or reactor of the engine 10 through the outlet port 3 and the conduit 3a.

When the internal combustion engine 10 is running at low speed, the main valve 5 moves against the force of the spring 6 and the opening 4a of the valve seat 4 is opened, causing a large amount of the secondary air to be supplied to the exhaust passage or reactor of the internal combustion engine 10. Further, as the internal combustion engine 10 runs at high speed, the air pressure fed by the air pump 11 gradually increases, causing the main valve 5 to further move against the spring 6 and a large amount of air to flow into the valve box 1. However, the auxiliary valve 8, 8a also moves, namely, the auxiliary valve 8 approaches the outlet port 3 in the embodiment of FIG. 1 or the auxiliary valve 8a protrudes into the outlet port 3 in the modification of FIG. 2, reducing the area of said outlet port through which the secondary air flows and decreasing the amount of the secondary air which is supplied to the exhaust system. Also, when the internal combustion engine reaches a certain level of high-speed revolution, the auxiliary valve 8 in FIG. 1 contacts the valve box 1 causing the secondary air to flow only through the ventilating holes 9, or the tapered auxiliary valve 8a in FIG. 2 fully protrudes into the outlet port 3, reducing the cross-sectional area of the opening of the outlet port 3 to the greatest extent. It has been confirmed by an experiment that the control valve means 1a of this invention, if fitted between the exhaust port of an internal combustion engine and the air pump 11, can reduce by 20 – 30% the unburnt noxious contents of exhaust gas as compared with a conventional control valve means having no auxiliary valve.

When considering the balance of the forces involved in the control valve means of this invention, the total of the dynamic pressure and static pressure of the secondary air acting on the face of the inlet port 2 side of the main valve 5 is balanced by the total of the force of the spring 6 acting on the face of the outlet port 3 side of the main valve 5 and the static pressure inside the exhaust passage or reactor acting on the faces of the outlet port 3 side of the main valve 5 and the auxiliary valve 8, 8a, whereby the movements of the main valve 5 and the auxiliary valve 8, 8a are determined and the volume of the secondary air to be supplied to the exhaust passage or reactor is controlled. Generally, even when the engine is operated at the same speed, the static pressure inside the exhaust passage or reactor is larger during acceleration or under large load than for deceleration or a small load. Accordingly, even if the engine is operated at the same speed, the above balance of the forces makes the auxiliary valve 8, 8a move farther away from the outlet port 3 and the area of said outlet port through which the secondary air flows increases more during acceleration or under a large load than during deceleration or under a small load. That is, if the control valve means of this invention is fitted in an exhaust gas purification system for an internal combustion engine, it is possible, even when the engine is run at the same speed, to automatically control the secondary air flow so as to supply the optimum amount of secondary air during acceleration or deceleration and according to the load so that the unburnt noxious contents of the exhaust gas are positively eliminated.

Also, if an "after burn" phenomenon takes places in the exhaust passage or reactor, an abnormally high exhaust pressure causes the main valve 5 to close the opening 4a, preventing exhaust gas from flowing backward into the inlet port 2. As the result, automatic action occurs for protecting the air pump 11 or other auxiliary equipment (for example, the relief valve means 14).

As mentioned above, this invention makes it possible, by fitting the control valve means having a very simple construction between the air pump and the exhaust passage or reactor of an internal combustion engine, to supply the optimum secondary air necessary for removing the unburnt noxious contents according to the running conditions of the internal combustion engine, and is of great practical valve in improving the durability of the reactor and reducing air pollution accountable to exhaust gas.

We claim:

1. An exhaust gas purification system for an internal combustion engine for oxidizing and eliminating the unburnt noxious contents in exhaust gas by supplying secondary air into exhaust gas from the engine, which comprises an air pump adapted to be driven by the engine, said engine having an exhaust passage connected to the exhaust thereof, a conduit connecting said air pump to said exhaust passage, and control valve means in said conduit including a valve body having an inlet port connected on the air pump side and an outlet port on the exhaust passage side, a main valve in said body, spring means inside said valve body urging said main valve toward said inlet port from downstream thereof for closing said inlet port and an auxiliary valve integral with said main valve and movable relative said outlet port for controlling the area of said outlet port as said main valve moves, said auxiliary valve reducing the area of the outlet port as the main valve moves to open the inlet port.

2. The exhaust gas purification system for an internal combustion engine as claimed in claim 1, in which said valve body has a valve seat provided with an opening connected to said inlet port and said main valve is forced by said spring against said valve seat so as to close said opening.

3. The exhaust gas purification system for an internal combustion engine as claimed in claim 2, in which said main valve has at least one hole therein in the portion which is outside of said seat for permitting easier flow of air past said main valve when the main valve is off said seat.

4. The exhaust gas purification system for an internal combustion engine as claimed in claim 1, in which said auxiliary valve consists of a plate member as an integral part of said main valve and has at least one ventilating hole in said member.

5. The exhaust gas purification system for an internal combustion engine as claimed in claim 1, in which said auxiliary valve consists of a bar member extending from said main valve as an integral part of said main valve in the direction of the outlet port and tapering as it extends away from said main valve.

6. An exhaust gas purification system for an internal combustion engine for oxidizing and eliminating the unburnt noxious contents in exhaust gas by supplying secondary air into exhaust gas from the engine, which comprises an air pump adapted to be driven by the engine, said engine having a reactor connected to the exhaust thereof, a conduit connecting said air pump to said reactor, and control valve means in said conduit including a valve body having an inlet port connected on the air pump side and an outlet port on the reactor side, a main valve in said body, spring means inside said valve body urging said main valve toward said inlet port from downstream thereof for closing said inlet port and an auxiliary valve integral with said main valve and movable relative said outlet port for controlling the area of said outlet port as said main valve moves, said auxiliary valve reducing the area of the outlet port as the main valve moves to open the inlet port.

7. The exhaust gas purification system for an internal combustion engine as claimed in claim 6, in which said valve body has a valve seat provided with an opening connected to said inlet port and said main valve is forced by said spring against said valve seat so as to close said opening.

8. The exhaust gas purification system for an internal combustion engine as claimed in claim 7, in which said main valve has at least one hole therein in the portion which is outside of said seat for permitting easier flow of air past said main valve when the main valve is off said seat.

9. The exhaust gas purification system for an internal combustion engine as claimed in claim 6, in which said auxiliary valve consists of a plate member as an integral part of said main valve and has at least one ventilating hole in said member.

10. The exhaust gas purification system for an internal combustion engine as claimed in claim 6, in which said auxiliary valve consists of a bar member extending from said main valve as an integral part of said main valve in the direction of the outlet port and tapering as it extends away from said main valve.

* * * * *